United States Patent [19]

Ozeki et al.

[11] Patent Number: 4,657,496
[45] Date of Patent: Apr. 14, 1987

[54] HOT-RUNNER MOLD FOR INJECTION MOLDING

[75] Inventors: Hirofumi Ozeki, Hashima; Takahide Kambe, Gifu, both of Japan

[73] Assignee: Gifu Husky Co., Ltd., Tokyo, Japan

[21] Appl. No.: 738,939

[22] Filed: May 29, 1985

[30] Foreign Application Priority Data

Jun. 4, 1984 [JP] Japan ................................. 59-113015
Mar. 11, 1985 [JP] Japan ................................. 60-47801

[51] Int. Cl.⁴ ............................................. B29C 45/16
[52] U.S. Cl. .................................... 425/130; 264/45.1; 264/328.8; 264/513; 425/131.1; 425/133.1; 425/562; 425/564
[58] Field of Search ................. 425/130, 131.1, 133.1, 425/132, 564, 562, 570, 572; 264/328.8, 45.1, 513

[56] References Cited

U.S. PATENT DOCUMENTS

| | | | |
|---|---|---|---|
| 3,037,245 | 6/1962 | Darnell | 425/562 |
| 3,849,048 | 11/1974 | Bielfeldt et al. | 425/570 |
| 3,947,175 | 3/1976 | Melcher | 425/130 |
| 3,947,177 | 3/1976 | Eckardt | 425/130 |
| 3,972,664 | 8/1976 | Fillman | 425/130 |
| 4,078,875 | 3/1978 | Eckardt | 425/564 |
| 4,376,625 | 3/1983 | Eckardt | 425/564 |

Primary Examiner—Jay H. Woo
Assistant Examiner—Timothy W. Heitbrink
Attorney, Agent, or Firm—Flynn, Thiel, Boutell & Tanis

[57] ABSTRACT

A hot-runner mold for injection molding for obtaining a product constructed of a multi-layered body made of two kinds of thermoplastic resinous materials comprises: a first hot-runner which communicates with an outlet formed in a hot-runner block and is provided in an interior of the hot-runner block; an outer stem received in the first hot-runner; a second hot-runner which communicates with an outlet formed in the outer stem and is provided in an interior of the outer stem; and an inner stem which is reciprocally movably received in the second hot-runner, so that a front end portion of the inner stem conducts an opening/closing operation of each of the outlets of the hot-runner block and the outer stem.

5 Claims, 10 Drawing Figures

HOT-RUNNER MOLD FOR INJECTION MOLDING

BACKGROUND OF THE INVENTION

1. Field of the Invention:

The present invention relates to a hot-runner mold for an injection molding, and more particularly to a hot-runner mold for obtaining a molded product constructed of a multi-layered body made of two thermoplastic resinous materials which are different in properties from each other.

2. Description of the Prior Art:

Hitherto, in case that it is necessary to obtain the kind of molded product constructed of a multi-laminated body, each layered element thereof is formed by a suitable process for forming a film at first, and then a plurality of the thus formed films, i.e., layered elements are piled up and reheated while formed into a desired final product shape in a final shaping process using compressed air. However, in the above conventional method, since at least two forming and shaping processes are required, it is necessary to provide a plurality of installations for conducting these processes. This results in an increase of the product cost and a difficulty in forming a product having a complex shape. This is a defect inherent in the conventional method.

Although it has been considered to obtain such kind of molded product constructed of the multi-layered body by the injection molding method, it is impossible to obtain a uniformly layered and molded product having a complex shape. Since, in this case, it is necessary to provide separate outlets for injecting the resinous materials into a cavity of a product mold, i.e., a cavity plate with respect to each of two kinds of the resinous materials, the hot-runner mold is complex in its construction and large in its size. In addition to this, since the resinous materials are injected into the cavity of the cavity plate from two different outlets, it is hard to obtain a uniformly layered and molded product. This is another defect inherent in the conventional injection molding method.

SUMMARY OF THE INVENTION

It is an object of the present invention to provide a hot-runner mold for injection molding, which hot-runner mold eliminates the conventional defects as described above, and enables its inner construction to be simplified, its size to be decreased and each layered element of the molded product to be uniformly formed in forming the molded product constructed of the multi-layered body by an injection molding method.

The above object of the present invention is achieved by providing a hot-runner mold for an injection molding comprising: a first hot-runner which communicates with an outlet formed in a hot-runner block and is provided in an interior of the hot-runner block; an outer stem received in the first hot-runner; a second hot-runner which communicates with an outlet formed in the outer stem and is provided in an interior of the outer stem; and an inner stem reciprocally movably received in the second hot-runner; whereby the inner stem is moved in a reciprocating manner so that its front end portion conducts an opening/closing operation of each of the outlets of the hot-runner block and the outer stem.

In obtaining the molded product by means of the hot-runner mold of the present invention, for example, at first, the outlet of the hot-runner block, which outlet has been closed by the inner stem, is opened by the same inner stem so that a first resinous material having been fed to the first hot-runner is injected into the cavity of the cavity plate through the outlet of the hot-runner block.

Then, the outlet of the outer stem, which outlet has been closed by the inner stem, is opened by the same inner stem so that a second resinous material, which is different in properties from the first resinous material and has been fed to the second hot-runner, is injected into the cavity of the cavity plate through the outlet of the outer stem and the outlet of the hot-runner block. Finally, the first resinous material having been fed to the first hot-runner is injected again into the cavity of the cavity plate through the outlet of the hot-runner block to pack the cavity with the resious materials completely. Namely, the first and the second resinous materials are alternately injected into the cavity of the cavity plate through the outlet of the hot-runner block to form the molded product constructed of the multi-layered body. As described above, the hot-runner mold of the present invention has a construction which enables two kinds of resinous materials to be alternately injected into the cavity of the cavity plate through the outlet of the hot-runner block, the hot-runner mold of the present invention is simple in its interior construction and has a small size while it enables the molded product to be uniformly formed in each layered element thereof.

DESCRIPTION OF THE PREFERRED EMBODIMENTS

Figure 1:
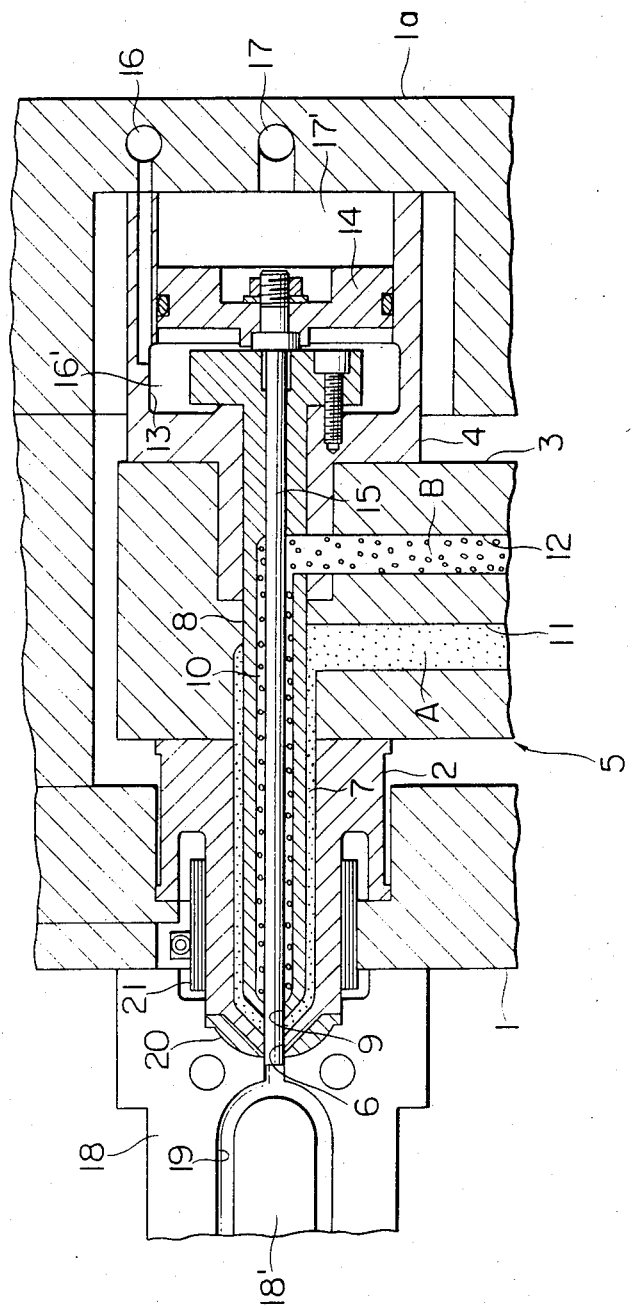
FIG. 1 is a longitudinal sectional front view of the essential part of an embodiment of the hot-runner mold of the present invention.

In FIG. 1, the reference numeral 1 designates a backing plate within which is incorporated a hot-runner block 5 comprising a nozzle housing 2, a manifold 3 and a valve bush 4. The hot-runner block 5 is provided with an outlet 6 which communicates with a first hot-runner 7 formed in the nozzle housing 2 and the manifold 3.

In the first hot-runner 7 is recieved an outer stem 8, a front end portion of which is spaced apart from the outlet 6 of the hot-runner bck 5. In the front end portion of the outer stem 8 is formed an outlet 9 which communicates with a second hot-runner 10 formed in an interior of the outer stem 8. The outlet 9 of the outer stem 8 is concentrically disposed with respect to the outlet 6 of the hot-runner block 5 so that the second hot-runner 10 is also concentrically disposed with respect to the first hot-runner 7. The numerals 11 and 12 designate resin passages for feeding a first resinous material A and a second resinous material B to the first hot-runner 7 and the second hot-runner 10, respectively.

A rear end portion of the outer stem 8 is fixed to the valve bush 4. In the second hot-runner 10 is movably received an inner stem 15 in reciprocation along the second hot-runner 10. A rear end portion of the inner stem 15 passes through the outer stem 8 to project into a cylinder chamber 13 formed in the valve bush 4 so that the rear end portion of the inner stem 15 is fixed to a piston 14 which is slidably received in the cylinder chamber 13.

The numeral 16 designates a fluid passage for feeding the fluid to a chamber 16' formed between the valve bush 4 and the piston 14. The numeral 17 designates another fluid passage for feeding the fluid to another chamber 17' formed between the piston 14 and a rear wall 1a of the backing plate 1. The numeral 18 designates a product mold, i.e., a cavity plate 18. The numeral 18' designates a core. The numeral 19 designates a cavity of the cavity plate 18. The numeral 20 designates a heat insulator. The numeral 21 designates a band heater. In the above hot-runner mold of the present invention, a large number of lesser passages branch off from the first and the second resin passages 11 and 12 in the manifold 13 so that a large number of first and second hot-runners similar to the first and the second hot-runners 7 and 10 shown in FIG. 1 are provided to make it possible that a large number of products are molded at once.

Now, an example of the procedure for molding the product constructed of the multi-layered body with the use of the hot-runner mold of the present invention described above will be hereinbelow described:

FIG. 1 shows an essential part of an embodiment of the hot-runner mold of the present inventiCon in operation but not in an injection phase in which the fluid has been fed to the chamber 17', so that the piston 14 has been advanced in a direction in which the piston 14 is spaced apart from the rear wall 1a of the backing plate 1, whereby both the outlets 6, 9 have been closed by the inner stem 15.

Figure 2:
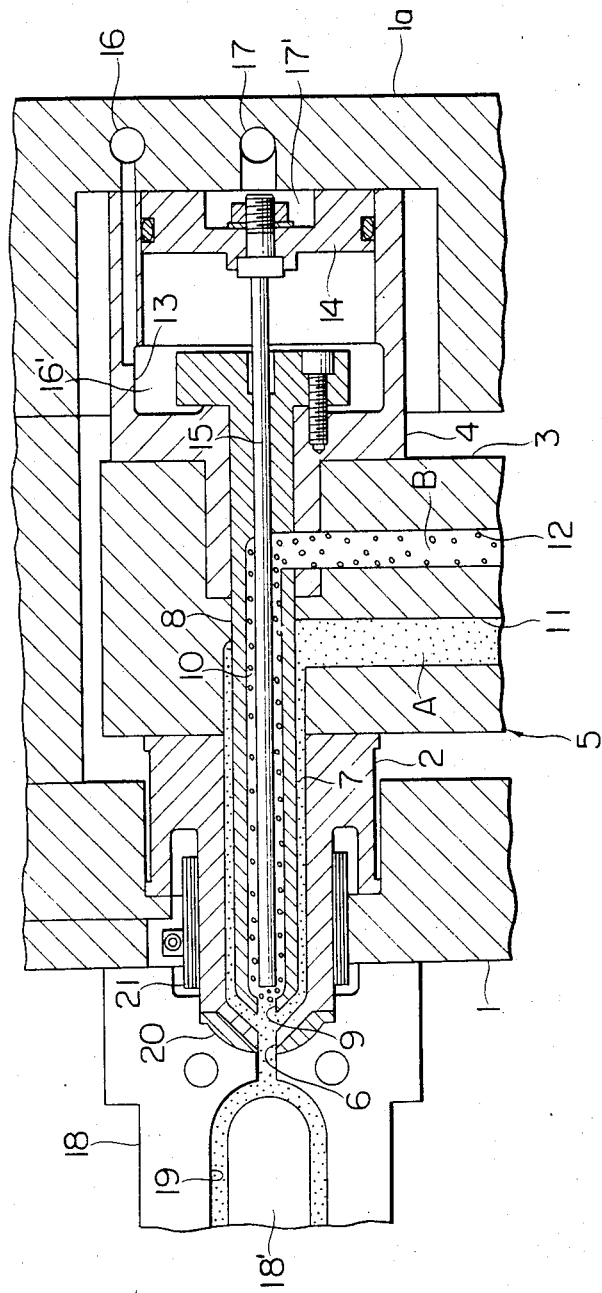
FIGS. 2 to 4 are longitudinal sectional front views similar to FIG. 1, which views show an example of a procedure for obtaining the molded product by means of the hot-runner mold of the present invention shown in FIG. 1, sequentially.

In this condition, when the fluid is fed to the chamber 16', the piston 14 is moved backward as shown in FIG. 2 so that the outlets 6, 9 are opened by the inner stem 15, and then the first resinous material A is fed to the first hot-runner 7 to be injected into the cavity 19 of the cavity plate 18 through the outlet 6 of the hot-runner block 5. At this time, an injected amount of the first resinous material A is regulated to be a predetermined ratio to a volume of the cavity 19 of the cavity plate 18.

Figure 3:
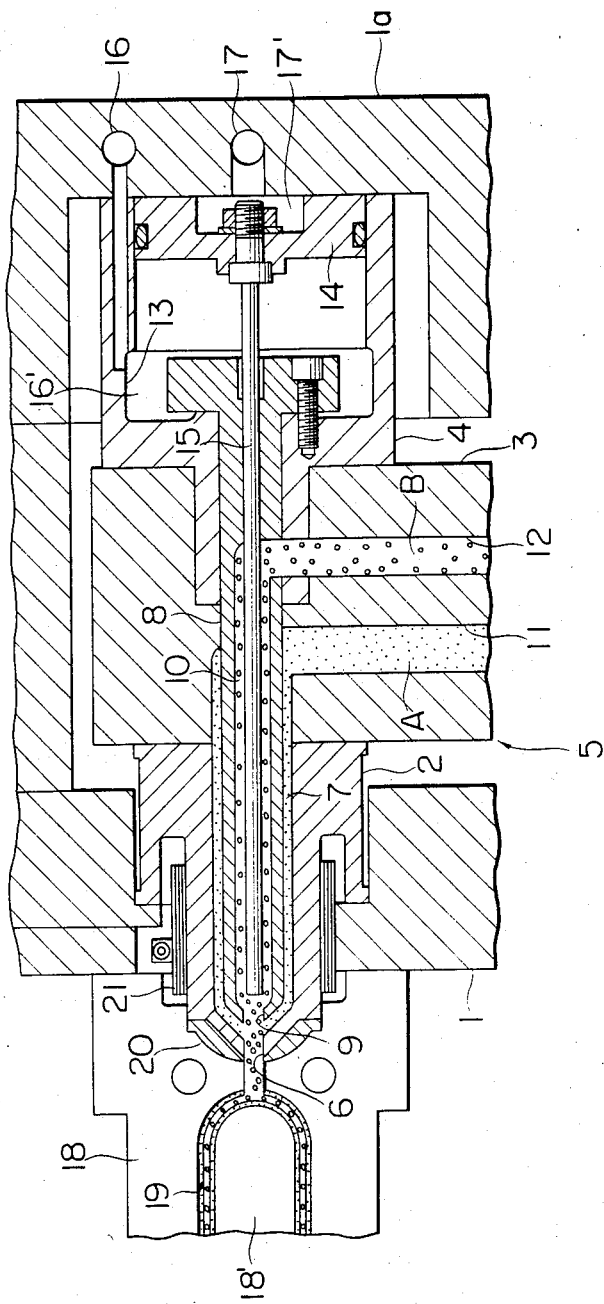

As shown in FIG. 3, the second resinous material B is then fed to the second hot-runner 10 to be sequentially passed through the outlets 9 and 6 so that the second resinous material B is injected into the cavity 19 of the cavity plate 18, whereby the thus injected second resinous material B is immersed in the first resinous material A. At this time, an injected amount of the second resinous material B is regulated to be a predetermined ratio to the volume of the cavity 19 of the cavity plate 18.

Figure 4:
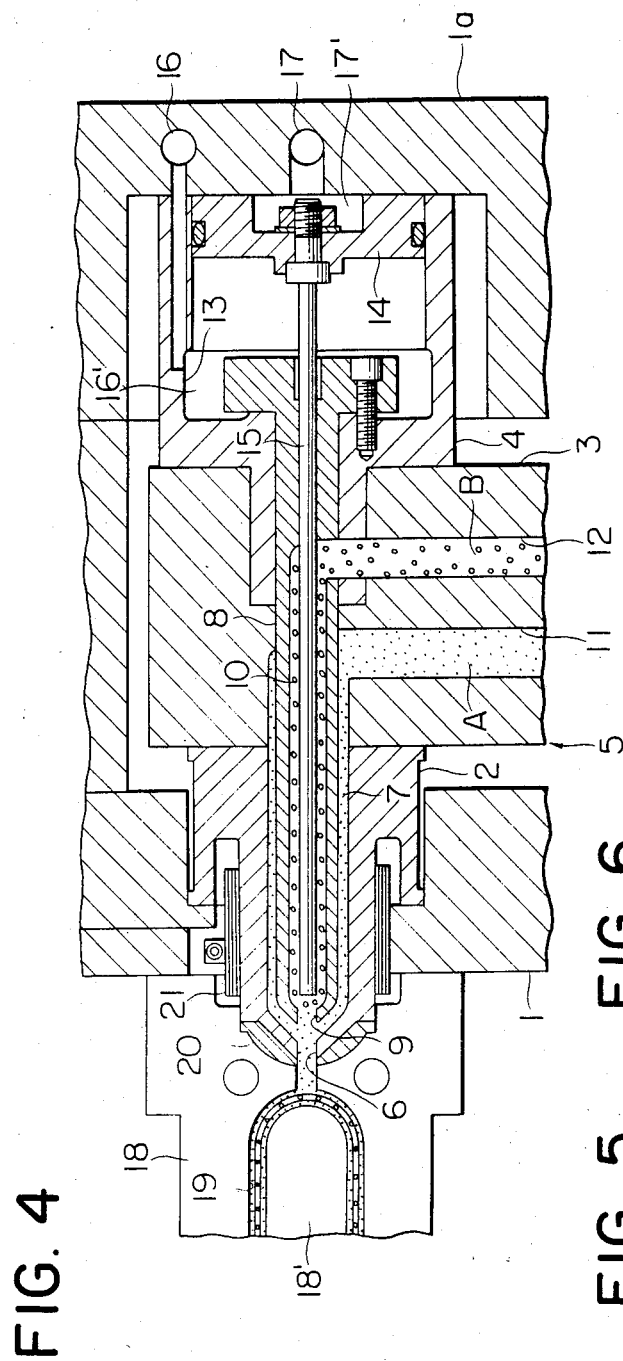

As shown in FIG. 4, the first resinous material A is then fed again to the first hot-runner 7 to be injected into the cavity 19 through the outlet 6 of the hot-runner block 5. At this time, an injected amount of the first resinous material A is regulated to be a predetermined ratio to the volume of the cavity 19 of the cavity plate 18 so that the cavity 19 is completely packed with the first and the second resinous materials A and B which have been injected into the cavity 19 three times as described above.

Now, when the fluid is fed again to the chamber 17', both the outlets 6, 9 are closed by the inner stem 15 so that a condition similar to that shown in FIG. 1 is produced again.

In this manner, the first resinous material A, the second resinous material B and the first resinous material A are injected three times in this order into the cavity 19 of the cavity plate 18 as described above so that the molded product constructed of the multi-layered body is obtained. In an injecting of the resinous materials, if there is a fear that the resinous materials may flow from one hot-runner to other hot-runner, i.e., that a reverse flowing of the resinous materials occurs, it is possible to prevent such reverse flowing from occurring by providing a check valve at least in one of the first and the second resin passages 11 and 12, preferably in the second resin passage 12.

Figures 5, 6:
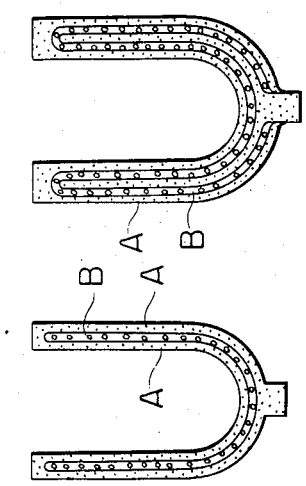
FIGS. 5 and 6 are longitudinal sectional views showing examples of the molded product.

FIG. 5 shows an example of the molded product in which the first and the second resinous materials A and B which are different in properties from each other are used, for example, a resinous material which is poor in airtightness but excellent in watertightness is used as the first resinous material A while another resinous material which is excellent in airtightness but poor in watertightness is used as the second resinous material B.

By varying the ratios of the injected amount of the first resinous material A, which is injected two times, it is possible to obtain a molded product partially constructed of five layers. Namely, when the injected amount of the first resinous material A is reduced at the first injection time thereof while increased at the second injection time of the same, it is possible to immerse the first resinous material A, which is injected at the second time, in the second resinous material B having been injected into the cavity 19 of the cavity plate 18 to make it possible to mold the product having five layers, whereby it is possible to make a thickness of a layer of the second resinous material B of the thus molded product thinner so that a harmful influence resulting from a difference in physical properties, for example, a difference in a thermal expansion rate between two kinds of the resinous materials, can be reduced.

Figure 7:
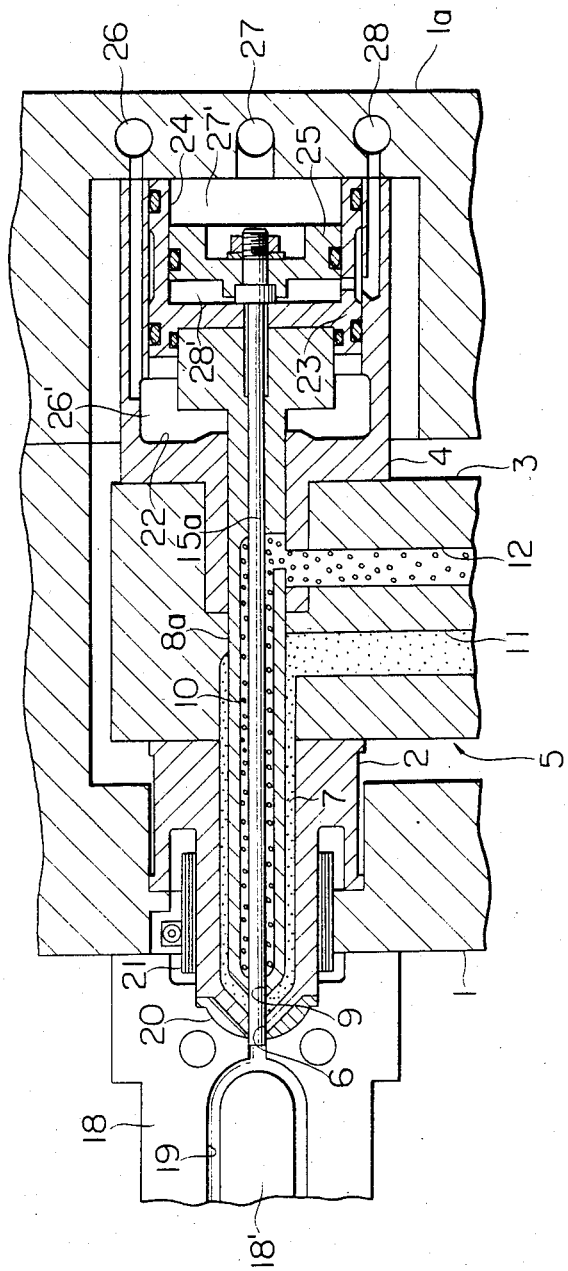
FIG. 7 is a longitudinal sectional front view of an essential part of another embodiment of the hot-runner mold of the present invention.

FIG. 7 shows another embodiment of the hot-runner mold of the present invention, in which embodiment the outer stem 8a is movably received in the first hot-runner 7 in reciprocating manner. A rear end portion of the outer stem 8a passes through the manifold 3 and the valve bush 4 to project into an outer cylinder chamber 22 formed in the valve bush 4 and the rear end portion of the outer stem 8a is fixed to an outer piston 23 which is slidably received in the outer cylinder chamber 22. The outer piston 23 is provided with an inner cylinder chamber 24 in a side reverse to the outer stem 8a, in which inner cylinder chamber 24 is slidably received an inner piston 25. A rear end portion of the inner stem 15a passes through the outer stem 8a and the outer piston 23 to project into the inner cylinder chamber 24 and the rear end portion of the inner stem 15a is fixed to the inner piston 25.

The numeral 26 designates a passage for feeding fluid to a chamber 26' formed between the valve bush 4 and the outer piston 23. The numeral 27 designates another passage for feeding fluid to another chamber 27' formed between the inner piston and the rear wall 1a of the backing plate 1. The numeral 28 designates a further passage for feeding fluid to a further chamber 28' formed between the outer piston 23 and the inner piston 25.

Now, another example of the procedure for molding the product constructed of the multi-layered body with the use of another embodiment of the hot-runner mold of the present invention will be hereinbelow described:

FIG. 7 shows an essential part of the another further embodiment of the hot-runner mold of the present invention in operation, but not in an injection phase in which fluid has been fed to both of the chambers 26', 27' so that the outer piston 23 is moved backward to the rear wall 1a of the backing plate 1 while the inner piston 25 is advanced to be spaced apart from the rear wall 1a of the backing plate 1, whereby both the outlets 6, 9 are closed by the inner stem 15a while a front end portion of the outer stem 8a is spaced apart from the outlet 6 of the hot-runner block 5.

Figure 8:
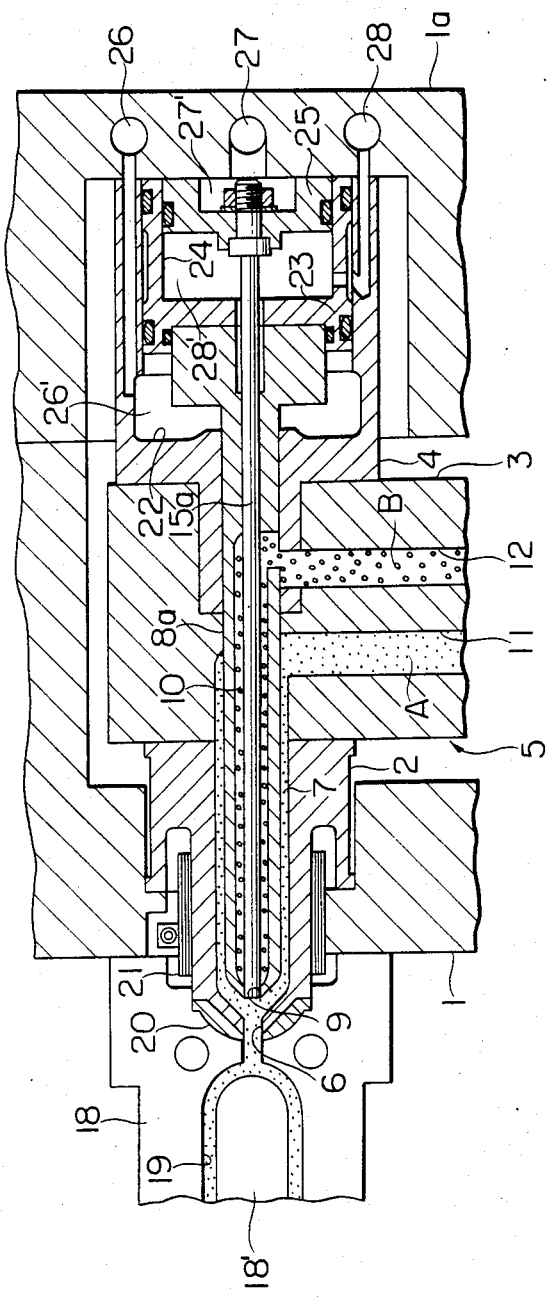
FIGS. 8 to 10 are longitudinal sectional front views similar to that of FIG. 7, which views show an example of a procedure for obtaining the molded product by means of the hot-runner mold of the present invention shown in FIG. 7.
Figure 9:
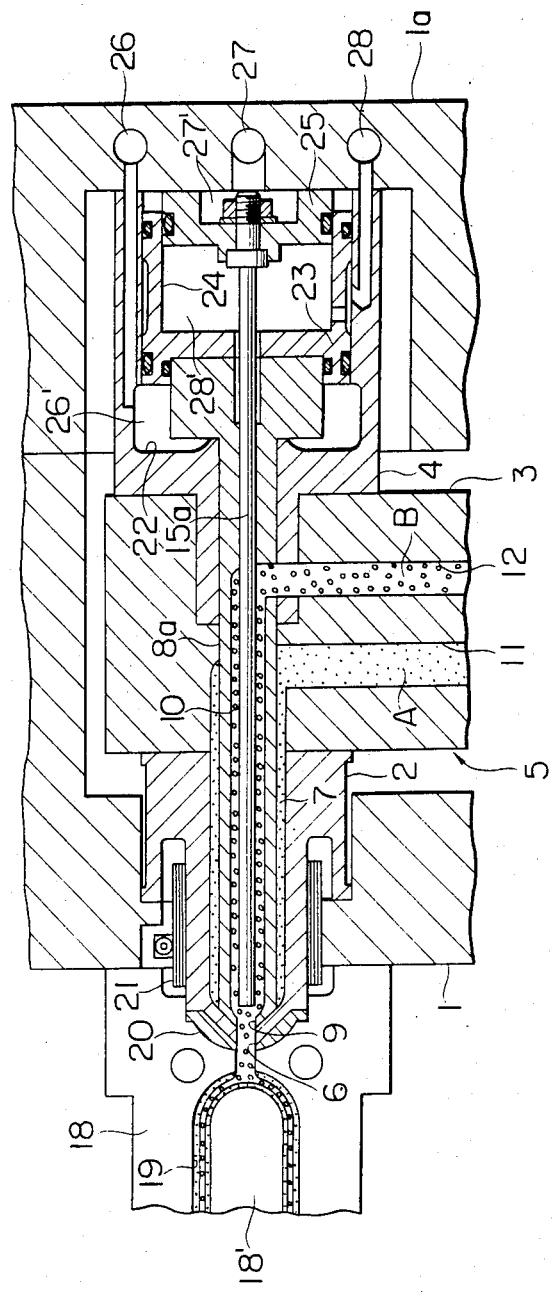

In this condition, when fluid is fed to both the chambers 26', 28' while feeding of fluid to the chamber 27' is stopped, the inner piston 25 is moved backward while the outer piston 23 is not moved since the fluid pressure receiving area of the outer piston 23 is larger in the chamber 26' in the chamber 28' as shown in FIG. 8, whereby the outlet 6 is opened by the inner stem 15a while only the outlet 9 is kept in a closed condition. Under such condition, the first resinous material A being fed to the first hot-runner 7 is injected into the cavity 19 of the cavity plate 18 through the outlet 6 of the hot-runner block 5. At this time, the injected amount of the first resinous material A is regulated to be a predetermined ratio to the volume of the cavity 19 of the cavity plate 18. Then, when feeding of the fluid to the chamber 26' is stopped while only feeding of the fluid to the chamber 28' is continued, the outer piston 23 is advanced as shown in FIG. 9 so that the front end portion of the outer stem 8a abuts against a peripheral edge portion of the outlet 6 of the hot-runner block 5, whereby the outlet 9 of the outer stem 8a is aligned with the outlet 6 of the hot-runner block 5 while the outlet 9 of the outer stem 8a is opened by the inner stem 15a. In this condition, the second resinous material B having been fed to the second hot-runner 10 is injected into the cavity 19 of the cavity plate 18 through both the outlets 6, 9. The thus injected second resinous material B is immersed in the first resinous material A. At this time, the injected amount of the second resinous material B is regulated to be a predetermined ratio to the volume of the cavity 19 of the cavity plate 18.

Figure 10:
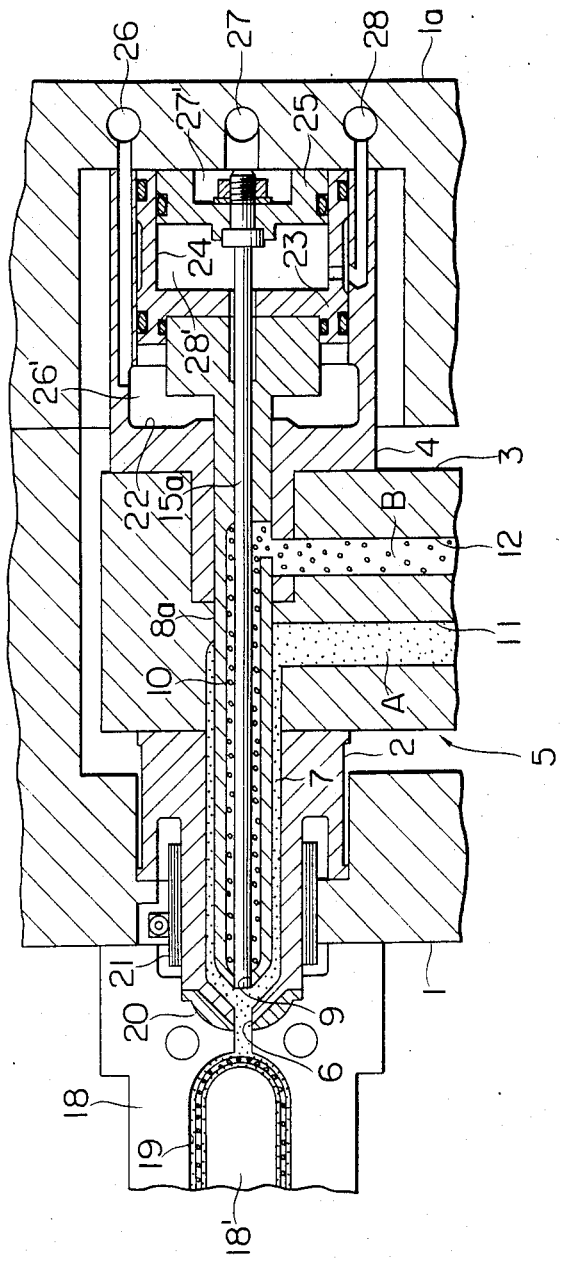

When feeding of the fluid to the chamber 28' is stopped while feeding of the fluid to the chamber 26' is started, the outer piston 23 is moved backward as shown in FIG. 10 so that the front end portion of the outer stem 8a is spaced apart from the outlet 6 of the hot-runner block 5 while only the outlet 9 of the outer stem 8a is closed by the inner stem 15a, i.e., a condition similar to that shown in FIG. 8 is produced again. In this condition, the first resinous material A having been fed to the first hot-runner 7 is injected again into the cavity 19 of the cavity plate 18 through the outlet 6 of the hot-runner block 5. At this time, the injected amount of the first resinous material A is regulated to be a predetermined ratio to the volume of the cavity 19 of the cavity plate 18 so that the cavity 19 is completely packed with the resinous materials injected three times as described above.

Then, when the fluid is fed to both of the chambers 26', 27', a condition similar to that shown in FIG. 7 is produced, in which condition both the outlets 6, 9 are closed by the inner stem 15a.

With the use of the above-mentioned procedures, the molded products, each of which is constructed of the multi-layered body as shown in FIGS. 5 and 6, are obtained. In the case of this embodiment of the present invention, since communication between the first and the second hot-runners 7 and 10 is prevented by the inner stem 15a at a time when the first resinous material A is injected while prevented by the outer stem 8a at a time when the second resinous material B is injected, it is possible to prevent the reverse flowing of the resinous materials from occurring and futher to prevent the mixing of the first and the second resinous materials A and B from occurring. This makes the hot-runner mold of the present invention suitable for the injection molding of the two different kinds of resinous materials which are apt to mix with each other.

What is claimed is:

1. In a hot-runner device for injection molding, including: a hot-runner block having therein a first hot-runner passage, said hot runner block having therein a first outlet opening which provides fluid communication between said first hot-runner passage and a location external to said hot-runner block; an outer stem supported in said first hot-runner passage for movement between two positions in which an end thereof is respectively engaging and spaced from a portion of said hot-runner block which has said first outlet opening therein, said outer stem having therein a second hot-runner passage and having in said end thereof a second outlet opening which is aligned with said first outlet opening and which provides fluid communication between said second hot-runner passage and a location external to said outer stem, an outer surface of said outer stem in the region of said end thereof being spaced inwardly from an inner surface of said first hot-runner passage; an inner stem which is smaller in cross-sectional size than said second hot-runner passage and is supported in said second hot-runner passage for reciprocal movement relative to said hot-runner block and said outer stem between first and second positions in which said inner stem is respectively spaced from and obstructing fluid flow through each of said first and second openings, said inner stem being movable to a third position which is between said first and second positions and in which said inner stem is spaced from said first outlet opening but is obstructing fluid flow through said second outlet opening; means for selectively supplying respective moldable materials to said first and second hot-runner passages; and fluid actuated means for selectively effecting movement of said inner and outer stems relative to said hot-runner block and independently of each other; the improvement comprising wherein said fluid actuated means includes said hot-runner block having therein a first chamber, said first hot-runner passage opening into said first chamber at a location remote from said first outlet opening, includes said outer stem having on an end thereof remote from said second outlet opening a first piston which is movable within and slidably sealingly engages an inner surface of said first chamber and which has therein a second chamber, said second hot-runner passage opening into said second chamber at a location remote from said second outlet opening, includes said inner stem having thereon a second piston which is movable within and slidably sealingly engages an inner surface of said second chamber, and includes means for selectively supplying pressurized fluid to said first and second chambers in a manner effecting reciprocal movement of said first and second pistons therein; wherein said first piston has means for providing fluid communication between said first and second chambers on sides of said first and second pistons remote from said first and second outlet openings, and wherein said means for selectively supplying pressurized fluid to said first and second chambers includes first and second fluid passages which respectively communicate with said first chamber on opposite sides of said first piston, a circumferential groove provided in and encircling said first piston, an opening in said first piston which provides fluid communication between said circumferential groove and said second chamber on a side of said second piston nearest said first and second outlet openings, and a third fluid passage which communicates with said first chamber at a location which is aligned with said circumferential groove in said first piston in all operational positions of said first piston.

2. The hot-runner device according to claim 1, wherein said hot-runner block has therein a plurality of said first outlet openings which are spaced and open through respective exterior surface portions of said block, and has therein a plurality of said first hot-runner passages which are spaced and each communicate with a respective one of said first outlet openings;

wherein said means for supplying moldable materials includes first and second resin passages in said hot-runner block, said first resin passage communication with each of said first hot-runner passages;

including a plurality of said tubular outer stems which are each disposed in a respective said first hot-runner passage, said tubular outer stems each having therein a respective said second hot-runner passage, each said outer stem having at an end thereof nearest the associated first outlet opening in said hot-runner block a respective said second outlet opening which provides fluid communication between the interior and exterior of said outer stem, wherein an outer surface of each said outer stem in the region of said end thereof having said second outlet opening is spaced inwardly from an inner surface of the associated first hot-runner passage;

including a plurality of said inner stems which are each smaller in cross-sectional size than said second hot-runner passages and which are each supported in a respective one of said outer stems for reciprocal movement relative thereto between a first position in which the inner stem is spaced from the associated first and second outlet openings and a second position in which a portion of the inner stem is disposed in and obstructs fluid flow through the associated first and second outlet openings, the inner stem being movable to a third position between said first and second positions in which said portion thereof is spaced from the associated first outlet opening but is disposed in and obstructs fluid flow through the associated second outlet opening; and wherein said means for supplying moldable material includes means for providing fluid communication between said second resin passage in said hot-runner block and said second hot-runner passage in each said outer stem.

3. The hot-runner device for injection molding as set forth in claim 2, wherein said end of each said outer stem is spaced from the associated first outlet opening in said hot-runner block, and wherein each said outer stem is fixedly secured to said hot-runner block at a location spaced from said end thereof.

4. The hot-runner device for injection molding as set forth in claim 3, wherein a plurality of said first chambers are provided in said hot-runner block, wherein each said first chamber has slidably supported therein a respective said first piston which is secured to a respective one of said outer stems, and wherein each said first piston has therein a respective said second piston to which a respective one of said inner stems is secured.

5. The hot-runner device according to claim 1, wherein said hot-runner block includes a portion which projects outwardly and has at an outer end thereof said first outlet opening, and including a band heater which encircles said outwardly projecting portion of said hot-runner block.

* * * * *

UNITED STATES PATENT AND TRADEMARK OFFICE
CERTIFICATE OF CORRECTION

PATENT NO. : 4 657 496

DATED : April 14, 1987

INVENTOR(S) : Hirofumi Ozeki et al

It is certified that error appears in the above-identified patent and that said Letters Patent is hereby corrected as shown below:

Column 8, line 36; after "second" insert ---chamber in which is slidably supported a respective said second---

Signed and Sealed this

First Day of September, 1987

*Attest:*

DONALD J. QUIGG

*Attesting Officer*  Commissioner of Patents and Trademarks